US007991856B2

(12) United States Patent
Takizawa et al.

(10) Patent No.: US 7,991,856 B2
(45) Date of Patent: Aug. 2, 2011

(54) NETWORK SYSTEM (75) Inventors: Eiichiro Takizawa, Fujisawa (JP);
Koichi Okita, Yokohama (JP); Ryosuke Kurata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1009 days.

(21) Appl. No.: 11/329,145

(22) Filed: Jan. 11, 2006

(65) Prior Publication Data

US 2006/0161652 A1 Jul. 20, 2006

(30) Foreign Application Priority Data

Jan. 14, 2005 (JP) ................. 2005-008226
Oct. 28, 2005 (JP) ................. 2005-313762

(51) Int. Cl.
*G06F 15/177* (2006.01)
*G06F 15/173* (2006.01)
*G06F 15/16* (2006.01)
*G06F 21/00* (2006.01)

(52) U.S. Cl. ........ 709/220; 709/221; 709/222; 709/223; 709/224; 709/226; 709/225; 709/250; 705/51

(58) Field of Classification Search .......... 709/220, 709/221, 223, 224, 225, 228, 229, 238, 243; 709/226, 250; 370/216, 218, 245, 409, 352; 340/539, 540, 541, 551, 573; 705/51

See application file for complete search history.

(56) References Cited

U.S. PATENT DOCUMENTS

| 6,982,953 B1* | 1/2006 | Swales | 370/218 |
| 7,093,030 B1* | 8/2006 | Henry et al. | 709/250 |
| 2001/0027442 A1* | 10/2001 | Krahn et al. | 705/51 |
| 2006/0031488 A1* | 2/2006 | Swales | 709/224 |
| 2006/0165056 A1* | 7/2006 | Komaki | 370/352 |

FOREIGN PATENT DOCUMENTS

| JP | 07-066809 | 3/1995 |
| JP | 2001-211180 | 8/2001 |

OTHER PUBLICATIONS

K.R. Sollins "The TFTP Protocol (Revision 2)" RFC783.txt, MIT, Jun. 1981.
R. Droms "Dynamic Host Configuration Protocol" RFC2131.txt, Bucknell University, Mar. 1997.
J. Case, et al. "A Simple Network Management Protocol (SNMP)" RCF1157.txt, MIT Laboratory for Computer Science, May 1990.
Super-pictorial DHCP, Network Magazine, vol. 9, No. 3, Askey Inc., Mar. 1, 2004, pp. 80-87.

* cited by examiner

*Primary Examiner* — Nathan Flynn
*Assistant Examiner* — Stephanie Chang
(74) *Attorney, Agent, or Firm* — Antonelli, Terry, Stout & Kraus, LLP.

(57) ABSTRACT

A network system automatically distributes management information to allow immediate monitoring. In the network system, the DHCP server of a network-information management server assigns information to a network-information management table when receiving an assignment request of IP information and network management information from a client. The DHCP client of the client obtains the IP information and the network management information from the DHCP server. The SNMP agent of the client reports to a monitoring server that the network management information has been set. The SNMP manager of the monitoring server determines that the network management information has been set, the monitoring control section of the monitoring server records information of the client in a monitoring control table, and starts monitoring the client.

14 Claims, 11 Drawing Sheets

| SOURCE IP | COMMUNITY NAME | ACCESS RIGHT | TRAP NOTICE SETTING |
|---|---|---|---|
| 10.251.9.21 | A_COM | read-write | on |

| IP ADDRESS | NET MASK |
|---|---|
| 172.23.15.91 | 255.255.255.0 |

| op(1) | htype(1) | hlen(1) | hops(1) |
|---|---|---|---|
| xid(4) ||||
| secs(2) || flags(2) ||
| ciaddr(4) ||||
| yiaddr(4) ||||
| siaddr(4) ||||
| giaddr(4) ||||
| chaddr(16) ||||
| sname(64) ||||
| sname(64) ||||
| file(128) ||||
| options(variable) ||||

| Version | Community Name | PDU |
|---|---|---|

| PDU TYPE | Enterprise | Agent Address | Generic Trap | Specific Trap | Time Stamp | Variable Bindings |
|---|---|---|---|---|---|---|

702   703

Fig. 7 a network-information management server apparatus and a client apparatus

Fig. 8 a monitoring server apparatus

Fig. 17

NETWORK SYSTEM

BACKGROUND OF THE INVENTION

1. Field of the Invention

The present invention relates to network systems, and more particularly, to a network system for executing automatic distribution processing of network management information and monitoring processing of network units.

2. Description of the Related Art

As the Internet has been widely used, networks have been made at various places. Then, it is demanded that each network be managed efficiently.

As a protocol for monitoring units connected to a network, Simple Network Management Protocol (SNMP), Common Management Information Protocol (CMIP), Transaction Language 1 (TL1), Hypertext Transfer Protocol (HTTP), or a vendor-unique protocol is used. A SNMP management method will be described below as an example.

SNMP is formed of an agent (SNMP agent) residing in a management-target unit (client or network-information management server) and a manager (SNMP manager) residing in a managing unit (monitoring server). Information exchanged between the SNMP manager and the SNMP agent is divided into three classes: requests and acknowledgements for information acquisition (Get command), requests and acknowledgements for information setting (Set command), and status-change notices (trap).

With a Get command, the SNMP manager requests the SNMP agent to obtain information. The SNMP agent refers to a management information base (MIB) to obtain information and sends it back to the SNMP manager. With a Set command, the SNMP manager requests the SNMP agent to perform setting. The SNMP agent changes MIB information and sends the result back to the SNMP manager. The SNMP agent sends a trap to the SNMP manager to report a change in status of the SNMP agent.

To perform communication with SNMP, it is necessary to specify a source IP, a community name, an MIB access right, a trap notice setting, and others in the SNMP agent. The source IP is usually set to the IP address of the SNMP manager, and is used as the destination of a trap sent from the SNMP agent to the SNMP manager. The community name is used for authentication between the SNMP manager and the SNMP agent. When the SNMP manager sends a Get or Set command by the SNMP packet to the SNMP agent, the SNMP manager stores the community name in the SNMP packet. The SNMP agent checks the community name, and, when the community name is an authorized community name, the SNMP agent executes an operation (such as that specified by a Get or Set command) permitted for the community name. The MIB access right is a right for the SNMP manager to access the MIB of the SNMP agent. The trap notice setting specifies whether the SNMP agent can send a trap. SNMP is described in RFC 1157.

As a method for automating network setting of units connected to a network, Dynamic Host Configuration Protocol (DHCP) or Bootstrap Protocol (BOOTP) is used. DHCP will be described here as an example.

With DHCP, information is exchanged between a unit (DHCP client) that receives setting information and a server (DHCP server) that manages setting information in a unified manner and assigns information to the DHCP client. When the DHCP server receives a network setting request from the DHCP client, the DHCP server sends information, such as an IP address, a net mask, and a default gateway to the DHCP client. DHCP is described in RFC 2131.

A technology for automatically obtaining network management information by the use of a combination of DHCP and TFTP has also been used (see non-patent document 3). When the DHCP server receives a network setting request, the DHCP server sends to the DHCP client, the IP address of a TFTP server and a file storage place from which downloading is to be executed. When the DHCP client finishes setting the IP address, the DHCP client downloads network management information from the TFTP server according to the information sent from the DHCP server.

Non-patent document 1: RFC 1157
Non-patent document 2: RFC 2131
Non-patent document 3: RFC 783 (TFTP), RFC 2131 (DHCP), http://www.cisco.com/japanese/warp/public/3/jp/service/manual_j/sw/cat30/3550 mscg/chapter04/04_swipaddr.html#18750 (Cisco URL information)

SUMMARY OF THE INVENTION

When a unit (a client or a network-information management server) that is to serve as an SNMP agent is newly connected to a network, IP information, such as an IP address, a net mask, and a default gateway, can be automatically specified with DHCP, but SNMP information, such as a source IP, a community name, an MIB access right, and a trap notice setting, cannot be automatically specified.

In general, SNMP information needs to be specified manually in an SNMP agent. If there are many SNMP agents, the administrator needs to handle a heavy work load. There is also another issue: Since the SNMP manager cannot monitor an SNMP agent until SNMP information is specified in the SNMP agent, the SNMP manager cannot detect failure information even if a failure occurs in the SNMP agent.

In SNMP, the community name is set to "public" as a default. If a network connection is continued with this setting, a terminal other than the SNMP manger can make an access, and there is a risk of unauthorized parameter setting or unauthorized acquisition of performance information and configuration information. The community name "public" does not have a role of the wild-card. When an SNMP client has a community name of "public", the SNMP server needs to have a community name of "public".

In a conventional technology where TFTP and DHCP are combined, a TFTP process needs to be activated in addition to a DHCP process. If there are many SNMP agents, since the server load increases due to file downloading in the TFTP server process, a high-performance server needs to be used. Since files are offered without any authentication, that is, without using an account or a password, in TFTP, the security level is very low. Some servers do not use TFTP in order to provide a sufficient security level. In that case, however, network management information cannot be obtained automatically.

When each SNMP agent has different network management information, the same number of files as that of SNMP agents are necessary, with the acquisition method of TFTP. A table file for associating a plurality of files with the SNMP agents needs to be separately prepared. If there are very many SNMP agents, management is tough. There is also a rink of erroneously assigning a file to a wrong SNMP agent by miss setting of a table file.

Accordingly, it is an object of the present invention to automatically set network management information simultaneously with the connection of a unit to a network and to allow an SNMP manager to access the unit.

A DHCP server is mounted to a network unit that assigns IP information and network management information. When the DHCP server receives an assignment request of IP information and network management information from a unit connected to the network, the DHCP server assigns information described in a network information management table.

A DHCP client and an SNMP agent are mounted to a network unit that assigns IP information and network management information. The DHCP client obtains IP information and network management information from the DHCP server and records them in an IP management table and an SNMP management table. The SNMP agent reports to a network unit that performs monitoring that the setting of the network management information has been completed, and performs SNMP communication with an SNMP manager by using the information recorded in the SNMP management table.

The SNMP manager and a monitoring control section are mounted to the network unit that performs monitoring. The SNMP manager determines by the report sent from the SNMP agent that the setting of the network management information has been completed. The monitoring control section records information of a unit to be monitored, in a monitoring control table, and monitors the unit.

According to the present invention, there is provided a network system comprising:

a monitoring server, a network-information management server, a client, and a network to which the monitoring server, the network-information management server, and the client are connected, wherein the client broadcasts a first request signal that has stored an assignment request of IP information and network management information when connecting to the network;

when receiving the first request signal, the network-information management server searches a network-information management table that has stored IP information and network management information assigned to the client in association with the address of the client, to obtain the IP information and the network management information corresponding to the address of the client, stores the IP information and the network management information in a first acknowledge signal, and unicasts the signal to the client;

when receiving the first acknowledge signal, the client broadcasts a second request signal that has stored an assignment request of IP information and network management information, in order to report to the network-information management server that the received information is to be used;

when receiving the second request signal, the network-information management server searches the network-information management table to obtain the IP information and network management information corresponding to the address of the client, stores the IP information and network management information in a second acknowledge signal, and unicasts the signal to the client;

when receiving the second acknowledge signal, the client stores the IP information stored in the second acknowledge signal, into an IP management table, and stores the network management information stored in the second acknowledge signal, into a network management table;

the client stores an IP address read from the IP management table, a community name read from the network management table, and a host name of the client into a notice signal, and sends the notice signal to the monitoring server; and when receiving the notice signal, the monitoring server stores information of the client in a monitoring control table, and starts monitoring and controlling the client.

According to the present invention, since information required for network management is automatically set simultaneously with the connection of a unit to a network, the maintenance person does not need to set network management information, and the maintenance load is reduced. In addition, the present invention prevents an unauthorized access which may occur when a unit is connected to a network with a community name used in protocols such as SNMP remaining in a default condition.

Further, according to the present invention, since a monitoring server can detect the completion of the setting of network management information in real time, a network unit can be monitored immediately.

Furthermore, according to the present invention, since network management information can be automatically obtained only with DHCP communication, a high-performance server is not required even if there are many SNMP agents. The present invention can also be applied to a case when TFTP is not to be used for a security reason. According to the present invention, since the SNMP agents and the network management information can be managed in the form of a list, management is easy and there is no risk of erroneously assigning information.

DESCRIPTION OF THE PREFERRED EMBODIMENTS

Embodiments of the present invention will be described below in detail by referring to the drawings.

1. System Configuration

First Embodiment

Figure 1:
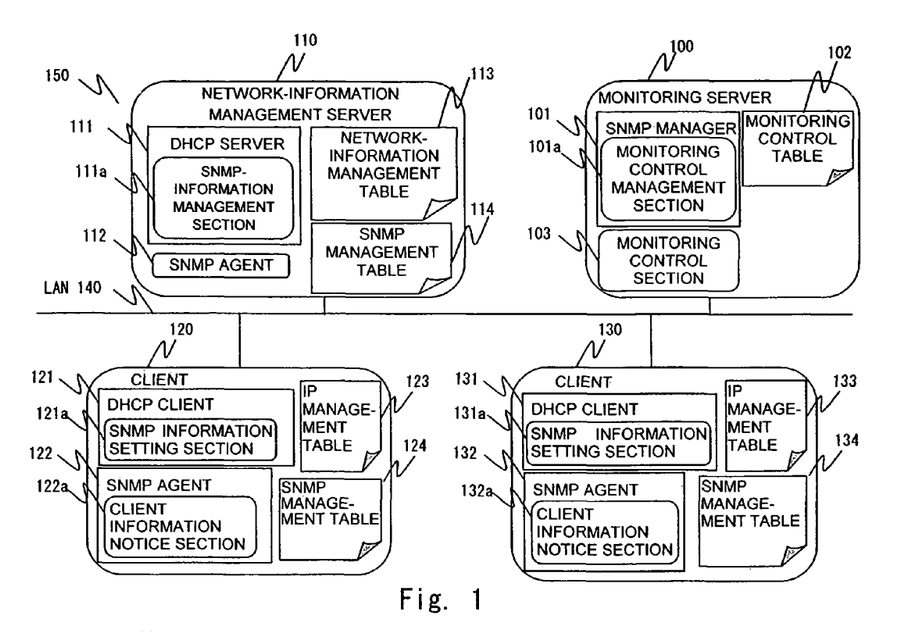
FIG. 1 is a block diagram of a network configuration.

FIG. 1 is a block diagram of a network configuration.

As shown in FIG. 1, a network 150 includes a monitoring server 100, a network-information management server 110, a client 120, and another client 130 all connected to a LAN 140.

The monitoring server 100 monitors and controls the network-information management server 110, the client 120, and the client 130. The monitoring server 100 implements an SNMP manager 101 and a monitoring control section 103 by software.

The SNMP manager 101 has a usual SNMP manager function and a monitoring control management section 101a serving as an interface with the monitoring control section 103. The monitoring control management section 101a performs SNMP communication among the network-information management server 110, the client 120, and the client 130 by a request sent from the monitoring control section 103. When the monitoring control management section 101a receives an SNMP trap from the network-information management server 110, the client 120, and the client 130, the monitoring control management section 101a reports the reception to the monitoring control section 103. The monitoring control section 103 refers to a monitoring control table 102 and monitors and controls the network-information management server 110, the client 120, and the client 130 through SNMP communication performed by the SNMP manager 101. The monitoring control section 103 also writes information of the client 120 and the client 130 into the monitoring control table 102 in response to a request from the monitoring control management section 101a.

Figure 2:
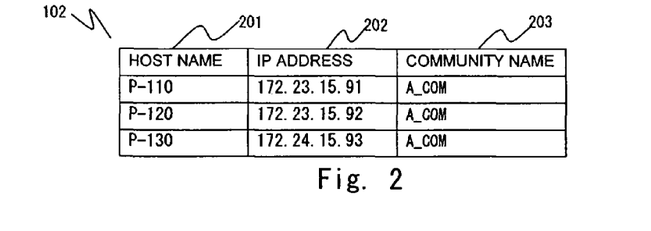
FIG. 2 shows a monitoring control table.

FIG. 2 shows the monitoring control table 102. As shown in FIG. 2, the monitoring control table 102 has areas for recording the host names 201, the IP addresses 202, and the community names 203 of SNMP agents, and records information of the network-information management server 110, the client 120, and the client 130.

The network-information management server 110 assigns IP information and SNMP information to the client 120 and the client 130. The network-information management server 110 also performs SNMP communication with the monitoring server 100.

The network-information management server 110 implements a DHCP server 111 and an SNMP agent 112 by software. The SNMP agent 112 has a usual SNMP agent function, refers to an SNMP management table 114, and performs SNMP communication with the monitoring server 100.

The DHCP server 111 has a usual DHCP function and an SNMP information management section 111a. When the DHCP server 111 receives an IP-information assignment request from the client 120 or the client 130, the DHCP server 111 refers to a network-information management table 113 to assign IP information. When the DHCP server 111 receives an SNMP-information assignment request, the SNMP information management section 111a refers to the network-information management table 113 to assign SNMP information.

Figure 3:
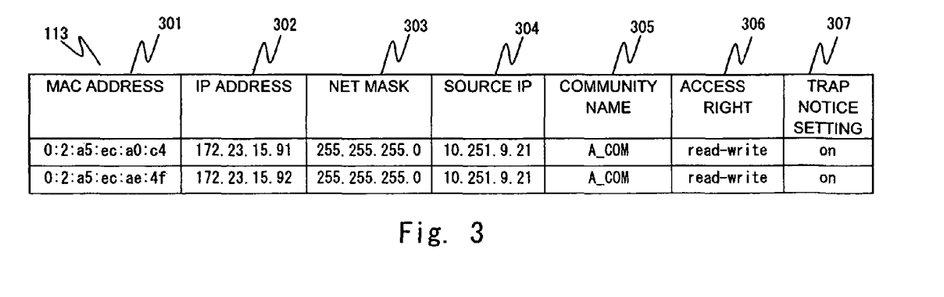
FIG. 3 shows a network-information management table.

FIG. 3 shows the network-information management table 113. As shown in FIG. 3, the network-information management table 113 has areas for recording the MAC address 301 of each client, an IP address 302 assigned to each client, a net mask 303, an SNMP source IP 304, an SNMP community name 305, an SNMP MIB access right 306, an SNMP trap notice setting 307.

The client 120 and the client 130 obtains IP information and SNMP information from the network-information management server 110. The client 120 and the client 130 also perform SNMP communication with the monitoring server 100, and send SNMP-information setting completion notices to the monitoring server 100.

The DHCP client 120 has a usual DHCP client function and an SNMP information setting section 121a, and the DHCP client 130 has a usual DHCP client function and an SNMP information setting section 131a. When the DHCP client 120 requests the network-information management server 110 to assign IP information, the DHCP client 120 records the IP information in an IP management table 123. When the DHCP client 120 requests SNMP information assignment, the DHCP client 120 calls an SNMP information setting section 121a to store the SNMP-information assignment request, to record the SNMP information in an SNMP management table 124, and to send an SNMP information setting completion notice to an SNMP agent 122. In the same way, when the DHCP client 130 requests the network-information management server 110 to assign IP information, the DHCP client 130 records the IP information in an IP management table 133. When the DHCP client 130 requests SNMP information assignment, the DHCP client 130 calls an SNMP information setting section 131a to store the SNMP-information assignment request, to record the SNMP information in an SNMP management table 134, and to send an SNMP information setting completion notice to the SNMP agent 132.

The SNMP agent 122 has a usual SNMP agent function and a client information notice section 122a, and the SNMP agent 132 has a usual SNMP agent function and a client information notice section 132a. The SNMP agent 122 refers to the SNMP management table 124 to perform communication with the monitoring server 100, and the SNMP agent 132 refers to the SNMP management table 134 to perform communication with the monitoring server 100. The client information notice section 122a reports SNMP-information setting completion to the monitoring server 100 when receiving a notice from the SNMP information setting section 121a, and the client information notice section 132a reports SNMP-information setting completion to the monitoring server 100 when receiving a notice from the SNMP information setting section 131a.

Figure 4:
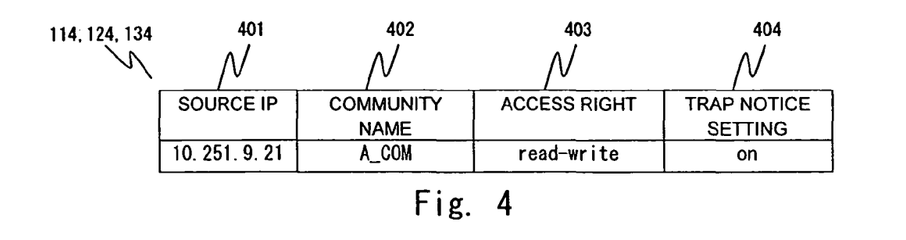
FIG. 4 shows an SNMP management table.

FIG. 4 shows an SNMP management table. As shown in FIG. 4, each of the SNMP management table 114, the SNMP management table 124, and the SNMP management table 134 has an area for recording SNMP information that includes an SNMP source IP 401, an SNMP community name 402, an SNMP MIB access right 403, and an SNMP trap notice setting 404.

Figure 5:
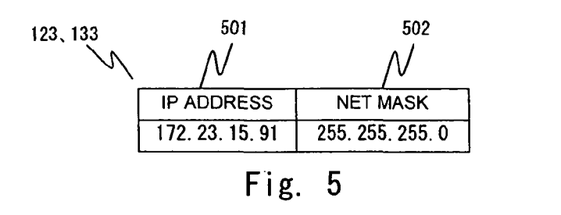
FIG. 5 shows an IP management table.

FIG. 5 shows an IP management table. As shown in FIG. 5, each of the IP management table 123 and the IP management table 133 has an area for recording information that includes an IP address 501 and a net mask 502.

Figure 6:
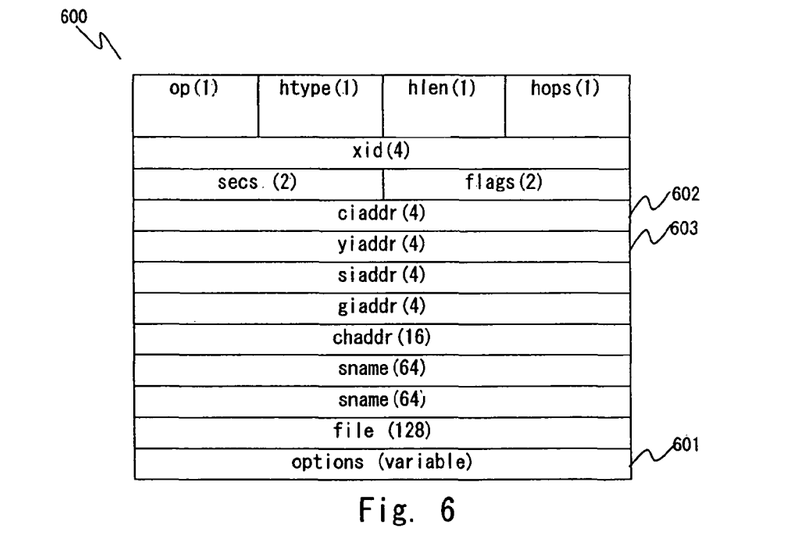
FIG. 6 shows a DHCP-message format.

FIG. 6 shows the format of messages exchanged between the DHCP server 111 and the DHCP client 121 or the DHCP client 131.

In a DHCP message 600, the size of each field is expressed by the numeral in octet, and "variable" indicates that the corresponding field has a variable length. Refer to RFC 2131 for the name and content of each field. Also refer to RFC 1533 for a method to specify data in the "options" field 601.

Figure 7:
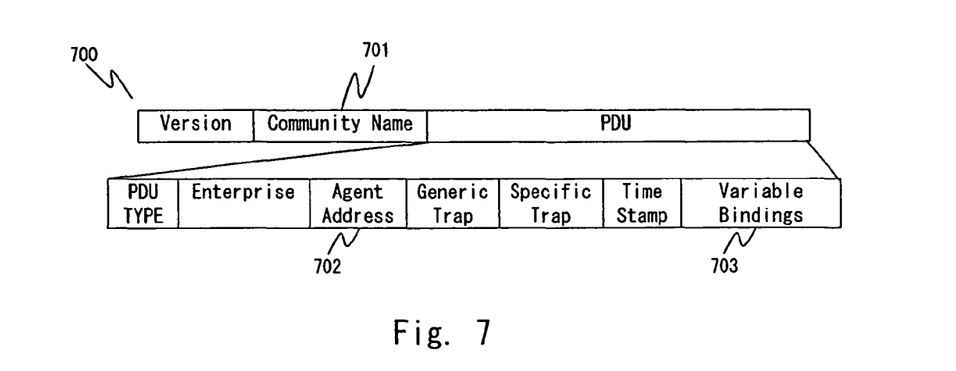
FIG. 7 shows an SNMP-trap format.

FIG. 7 shows the format of messages exchanged between the SNMP manager 101, and the SNMP agent 112, the SNMP agent 122, or the SNMP agent 132. Refer to RFC 1157 for the name and content of each field in the SNMP message 700.

Figure 8:
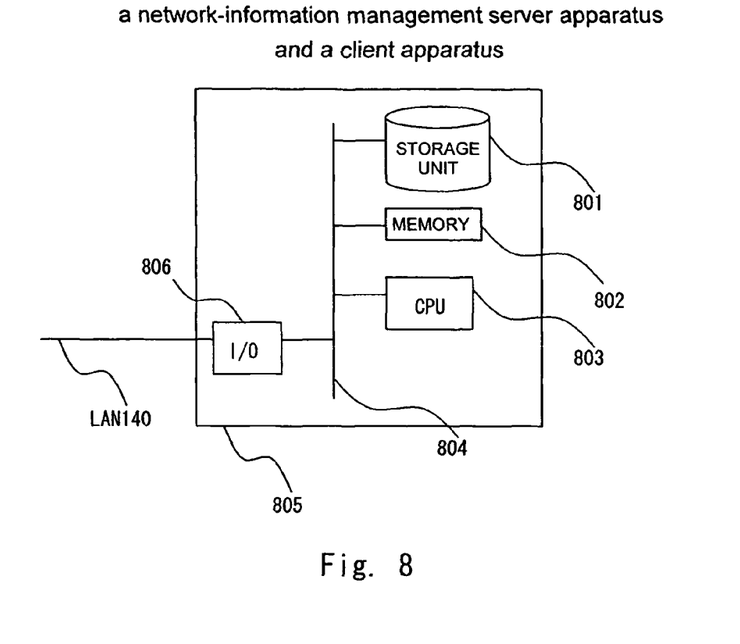
FIG. 8 is a block diagram of a network-information management server and a client apparatus.

FIG. 8 is a block diagram of the network-information management server 110, the client 120, and the client 130.

A DHCP server 805 and a client apparatus 805 communicate with the monitoring server 100 through the LAN 140. Each of the DHCP server 805 and the client apparatus 805 has a storage unit 801, a memory 802, a CPU 803 and an input and output section 806 all of which are connected by an internal bus 804. The input and output section 806 is an interface for connecting to the LAN 140 and for communicating with an apparatus. The CPU 803 controls the whole of the DHCP server 805 or the client apparatus 805, and execute programs, such as the DHCP server 111, the SNMP agent 112, the SNMP agent 122, the SNMP agent 132, the DHCP client 121, and the DHCP client 131 and exchanges data with them, through the input and output section 806. The memory 802 stores the operation program of the CPU 803 and others. The storage unit 801 stores information such as the network information management table 113, the SNMP management table 114, the SNMP management table 124, the SNMP management table 134, the IP management table 114, and the IP management table 133; and programs, such as the DHCP server 111, the SNMP agent 112, the SNMP agent 122, the SNMP agent 132, the DHCP client 121, and the DHCP client 131.

Figure 9:
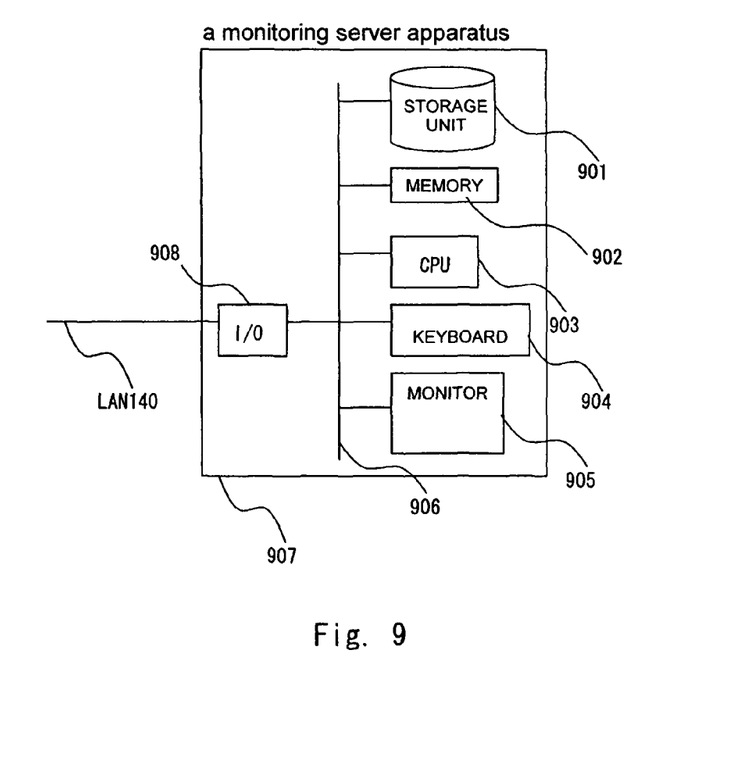
FIG. 9 is a block diagram of a monitoring server.

FIG. 9 is a block diagram of the monitoring server 100.

A monitoring server 907 communicates with the network-information management server 110, the client 120, and the client 130 through the LAN 140. The monitoring server 907 includes a storage unit 901, a memory 902, a CPU 903, a keyboard 904, a monitor 905, and an input and output section 908 all of which are connected by an internal bus 906. The input and output section 908 is an interface for connected to the LAN 140 and for communicating with the network-information management server 110, the client 120, and the client 130. The CPU 903 controls the entire monitoring server 907, and executes programs, such as the SNMP manager 101 and the monitoring control section 103, and exchanges data through the input and output section 908. The memory 902 stores the operation program of the CPU 903, and others. The storage unit 901 stores the monitoring control table 102 and programs, such as the SNMP manager 101 and the monitoring control section 103.

2. Operation

First Embodiment

Figure 10:
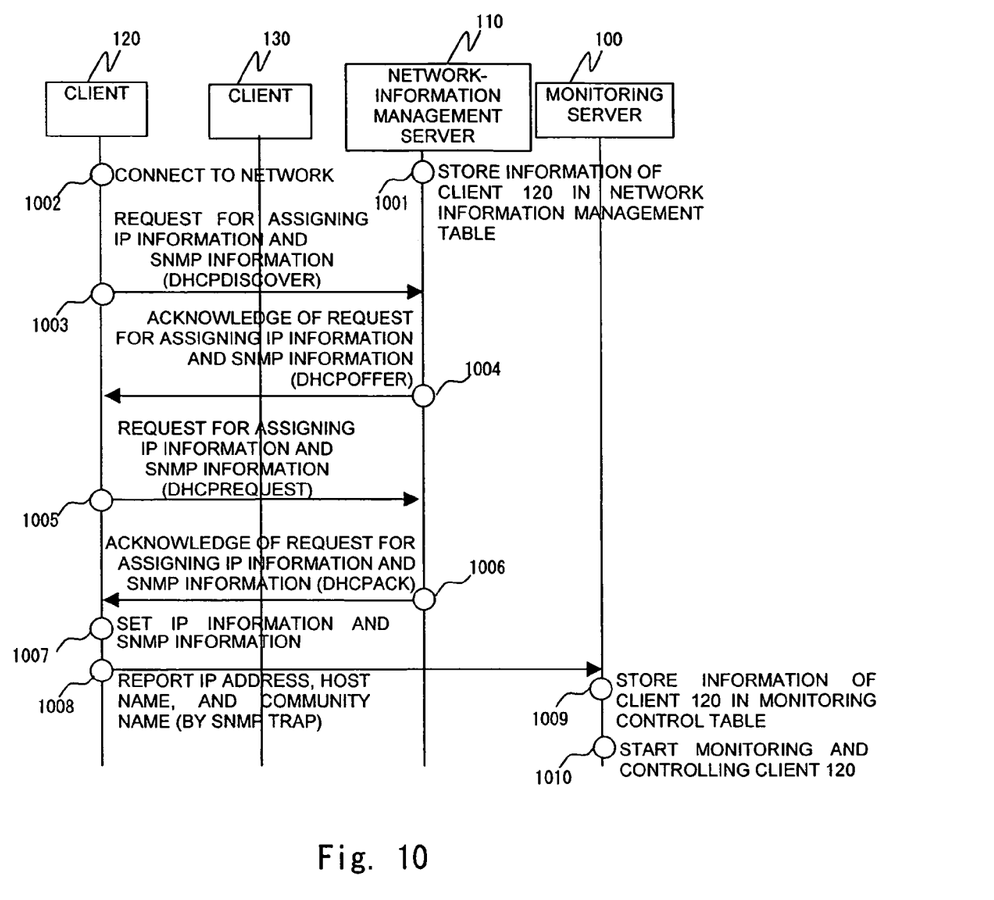
FIG. 10 shows a sequence used for automatic distribution of network management information and immediate monitoring performed by the monitoring server.

FIG. 10 shows a sequence used for automatic distribution of network management information and immediate monitoring performed by the monitoring server.

A sequence used for automatic distribution of network management information to the client 120 and immediate monitoring performed by the monitoring server 100 will be described next by referring to FIG. 10.

The network-information management server 110 stores in advance IP information and SNMP information assigned to clients connected to the LAN 140, such as the clients 120 and 130, in the network information management table 113 in association with the MAC addresses in step 1001. These pieces of information can be input from an input section or transmitted from an appropriate apparatus.

When the client 120 is connected to the LAN 140 in step 1002, the DHCP client 121 is activated and broadcasts DHCPDISCOVER that has stored an assignment request of IP information and SNMP information in step 1003.

When the DHCP server 111 of the network-information management server 110 receives DHCPDISCOVER, the DHCP server 111 searches the network information management table 113. When IP information and SNMP information corresponding to the MAC address of the client 120 have been stored, the DHCP server 111 stores information of the network information management table 113 in DHCPOFFER and unicasts it to the client 120 in step 1004. As described later, when IP information and SNMP information corresponding to the MAC address have not been stored, this processing is not executed.

When the DHCP client 121 of the client 120 receives DHCPOFFER, the DHCP client 121 broadcasts DHCPRE-QUEST that has stored an assignment request of IP information and SNMP information in order to report to the network-information management server 110 that DHCPOFFER is to be used, in step 1005.

When the DHCP server 111 of the network-information management server 110 receives DHCPREQUEST, the DHCP server 111 searches the network information management table 113. When IP information and SNMP information corresponding to the MAC address of the client 120 have been stored, the DHCP server 111 stores information of the network information management table 113 in DHCPACK and unicasts it to the client 120 in step 1006. As described later, when IP information and SNMP information corresponding to the MAC address have not been stored, this processing is not executed.

When there is only one network-information management server 110, neither the process of step 1005 nor the process of step 1006 needs to be performed. When there is a plurality of network-information management servers 110, the processes of steps 1005 and 1006, where the client 120 identifies the corresponding network-information management server, need to be performed.

When the DHCP client 121 of the client 120 receives DHCPACK, the DHCP client 121 stores the IP information stored in DHCPACK, including the IP address and the net mask, in the IP management table 123, and also stores the SNMP information stored in DHCPACK, including the SNMP source IP, the SNMP community name, the SNMP access right, and the SNMP trap notice setting, in the SNMP management table 124, in step 1007. When information has been stored in the IP management table 123 and the SNMP management table 124 because the client 120 was connected before or for some reason, the information is overwritten.

When the SNMP information has been set in the client 120, the SNMP agent 122 stores the IP address read from the IP management table 123, a host name specified in the client 120, and the community name read from the SNMP management table 124, in an SNMP trap, and sends it to the monitoring server 100 in step 1008.

When the SNMP manager 101 of the monitoring server 100 receives the SNMP trap, the monitoring control section 103 stores information of the client 120 in the monitoring control table 102 in step 1009, and start monitoring and controlling the client 120 in step 1010.

Figure 11:
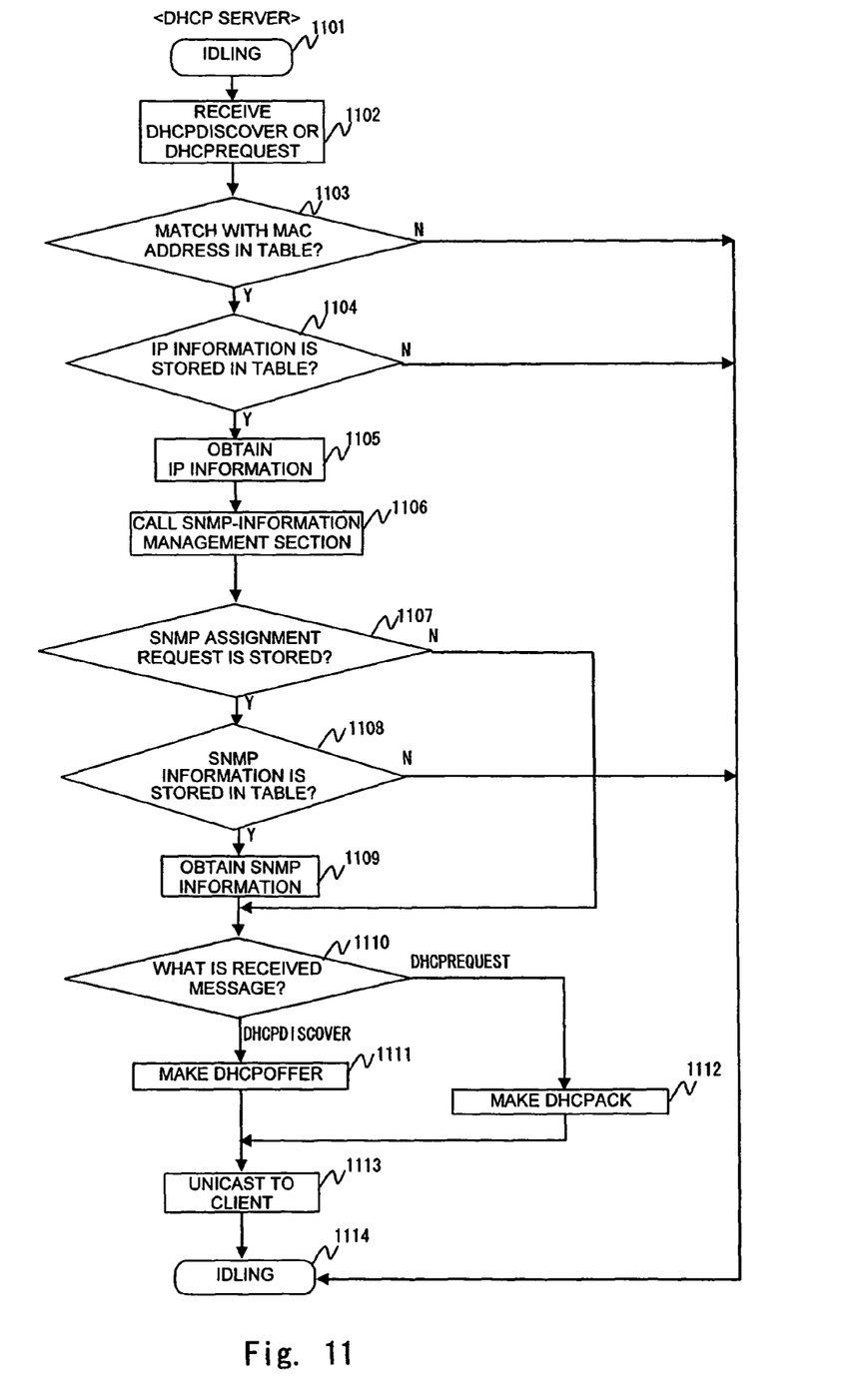
FIG. 11 is a flowchart of processing of a DHCP server on the network-information management server.

FIG. 11 is a flowchart of processing of a DHCP server on a network-information management server. The operation of the DHCP server 111 on the network-information management server 110 will be described by referring to FIG. 11.

When the DHCP server 111 receives DHCPDISCOVER or DHCPREQUEST in step 1102, the DHCP server 111 compares the MAC address of the client 120, stored in ciaddr 602 of DHCPDISCOVER or DHCPREQUEST, with the MAC address 301 in the network information management table 113, in step 1103.

When the MAC addresses match, the DHCP server 111 determines in step 1104 whether the IP information including the IP address 302 and the net mask 303 is stored in the matched record. When the IP information has been stored, the DHCP server 111 obtains the IP information in step 1105.

Then, the DHCP server 111 calls the SNMP-information management section 111a in step 1106, and it is determined in step 1107 whether an SNMP-information assignment request is stored in the options field 601 of DHCPDISCOVER or DHCPREQUEST. When it has been stored, it is determined in step 1108 whether the SNMP information including the SNMP source IP 304, the SNMP community name 305, the SNMP access right 306, and the SNMP trap notice setting 307 is stored in the network information management table 113. When it has been stored, the SNMP information is obtained in step 1109.

Next, the DHCP server 111 checks the received message in step 1110. When the received message is DHCPDISCOVER, DHCPOFFER is made in step 1111. When the received message is DHCPREQUEST, DHCPACK is made in step 1112. DHCPOFFER and DHCPACK has the same format as a DHCP message 600, and stores the IP address of the client 120 in yiaddr 603, the net mask of the client 120 in the options field 601, and, when an SNMP-information assignment request is found in step 1107, the SNMP source IP, the SNMP community name, the SNMP access right, and the SNMP trap notice setting in the options field 601, in steps 1111 and 1112.

Then, the DHCP server 111 unicasts DHCPOFFER or DHCPACK to the client in step 1113, and becomes idling in step 1114.

When it is found in step 1103, 1104, or 1108 that the information concerned is not stored in the network information management table 113, the processing is terminated and the DHCP server 111 becomes idling in step 1114.

When an SNMP-information assignment request is not found in step 1107, steps 1108 and 1109 are skipped and the SNMP-information acquisition processing is not performed.

Figure 12:
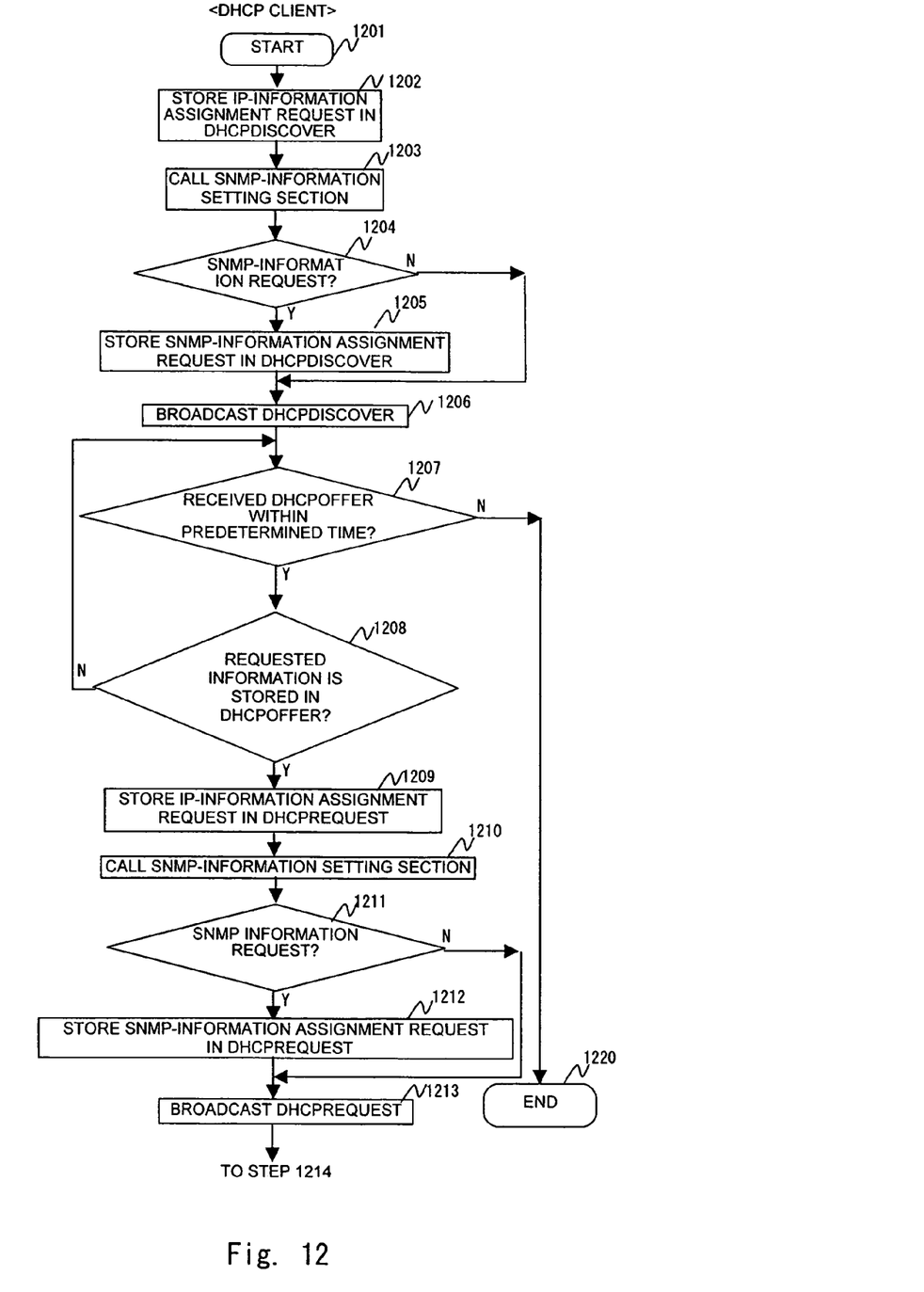
FIG. 12 is a flowchart (1) of processing of a DHCP client and an SNMP agent on the client apparatus.
Figure 13:
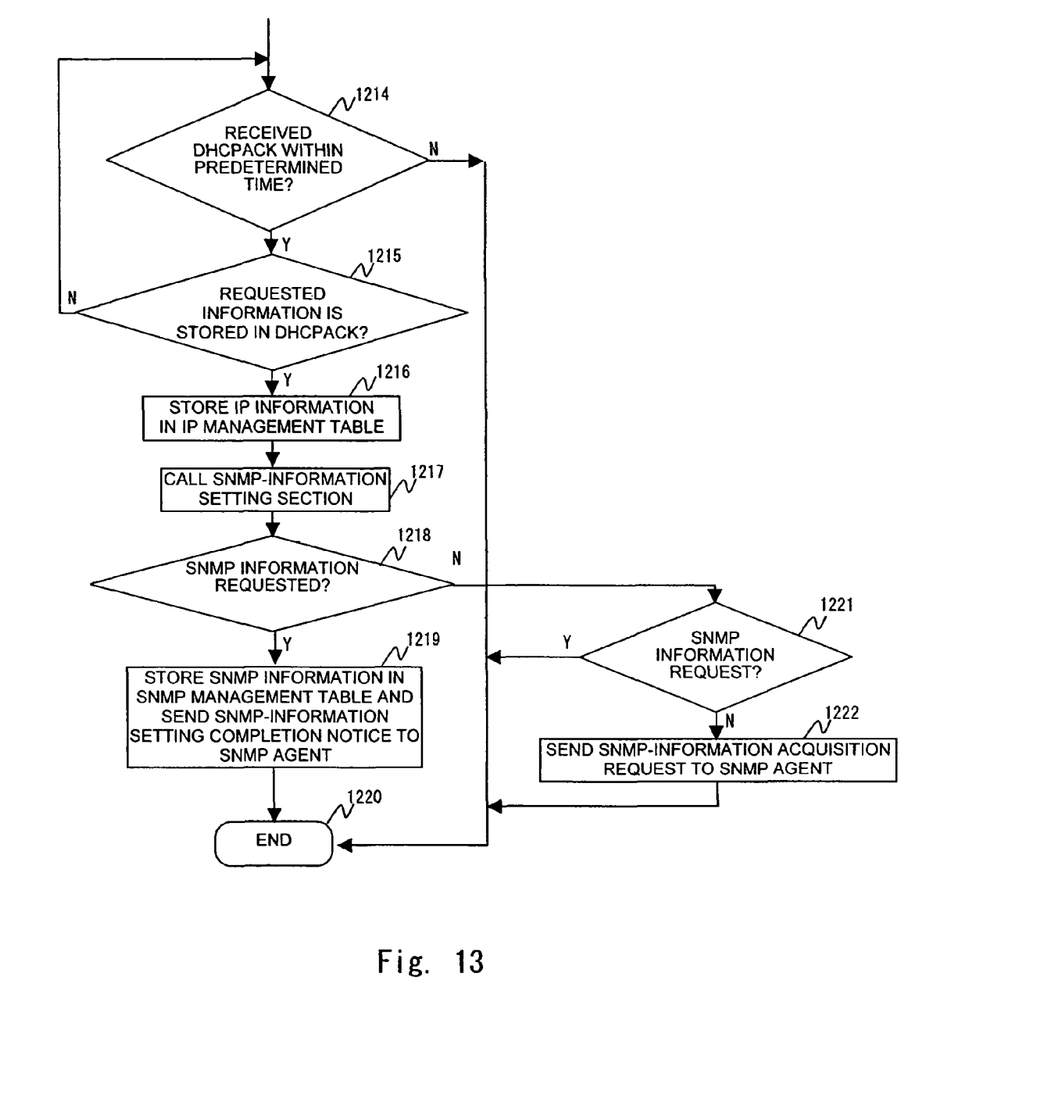
FIG. 13 is a flowchart (2) of the processing of the DHCP client and the SNMP agent on the client apparatus.
Figure 14:
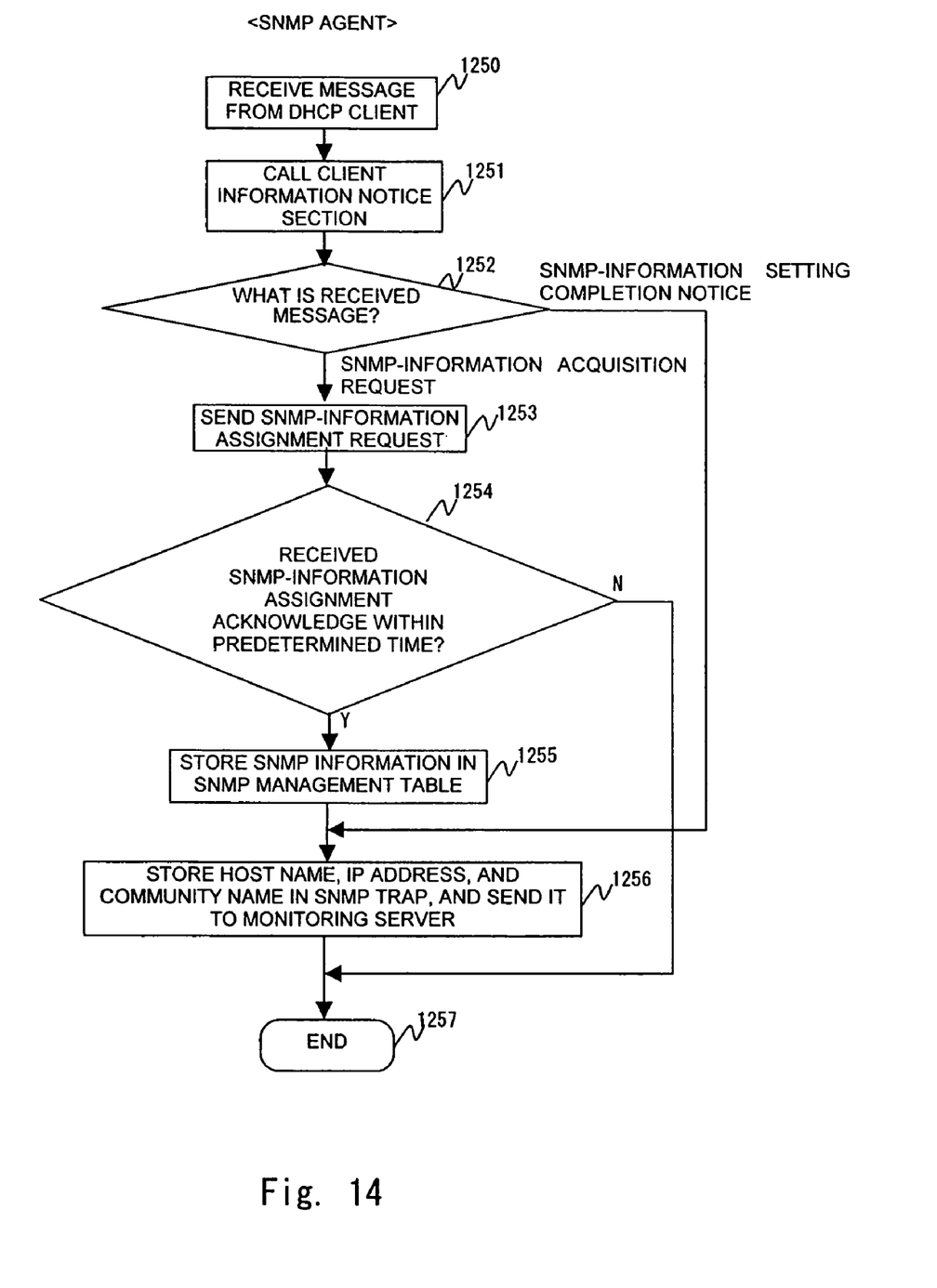
FIG. 14 is a flowchart (3) of the processing of the DHCP client and the SNMP agent on the client apparatus.

FIG. 12 to FIG. 14 are flowcharts (1) to (3) of processing performed by a DHCP client and an SNMP agent provided for a client apparatus. The operations of the DHCP client 121 and the SNMP agent 122 on the client 120 will be described next by referring to FIG. 12 to FIG. 14.

When the client 120 connects to the LAN 140, the DHCP client 121 is activated in step 1201, and stores the MAC address of the client 120 in ciaddr 602 and a client net mask request in the options field 601 in DHCPDISCOVER, which has the same format as a DHCP message 600, in 1202.

Then, the DHCP client 121 calls the SNMP-information setting section 121a in step 1203, and when SNMP information is not specified in the SNMP management table 124, or when a default setting remains, in step 1204, an SNMP source IP request, an SNMP community name request, an SNMP access right request, and an SNMP trap notice setting request are stored in the options field 601 of DHCPDISCOVER in step 1205. When an SNMP information request is not performed in step 1204, step 1205 is skipped. When it is found in step 1204 that the SNMP agent is to obtain SNMP information, as described in a sixth embodiment, step 1205 is skipped.

Then, the DHCP client 121 broadcasts DHCPDISCOVER in step 1206.

After sending DHCPDISCOVER, the DHCP client 121 waits for DHCPOFFER to come for a constant time in step 1207. When it receives DHCPOFFER within a predetermined time, the DHCP client 121 determines in step 1208 whether the information requested by DHCPDISCOVER is stored in DHCPOFFER. When the information is stored, the DHCP client 121 stores the MAC address of the client 120 in ciaddr 602 and a client net mask request in the options field 601 in DHCPREQUEST, which has the same format as a DHCP message 600, in step 1209.

Then, the DHCP client 121 calls the SNMP-information setting section 121a in step 1210, and when SNMP information is not specified in the SNMP management table 124, or when a default setting remains, in step 1211, an SNMP source IP request, an SNMP community name request, an SNMP access right request, and an SNMP trap notice setting request are stored in the options field 601 of DHCPREQUEST in step 1212. When an SNMP information request is not performed in step 1211, step 1212 is skipped. When it is found in step 1211 that the SNMP agent is to obtain SNMP information, as described in the sixth embodiment, step 1212 is skipped.

Then, the DHCP client 121 broadcasts DHCPREQUEST in step 1213.

After sending DHCPREQUEST, the DHCP client 121 waits for DHCPACK to come for a constant time in step 1214. When it receives DHCPACK within a predetermined time, the DHCP client 121 determines in step 1215 whether the information requested by DHCPREQUEST is stored in DHCPACK. When the information is stored, the DHCP client 121 stores the IP address stored in yiaddr 603 and the net mask stored in the options field 601 in the IP management table 123, in step 1216.

Then, the DHCP client 121 calls the SNMP-information setting section 121a in step 1217, and when it is determined in step 1218 that SNMP information was requested in step 1211, the SNMP source IP, the SNMP community name, the SNMP access right, and the SNMP trap notice setting stored in the options field 601 of DHCPACK are stored in the SNMP management table 124, an SNMP-information setting completion notice is sent to the SNMP agent 122 in step 1219, and the processing is terminated in step 1220. The SNMP-information setting completion notice is sent to an SNMP-agent port with User Datagram Protocol/Internet Protocol (UDP/IP). When it is determined in step 1218 that SNMP information was not requested, the processing proceeds to step 1221. When the SNMP agent is to obtain SNMP information, as described in the sixth embodiment, the DHCP client 121 sends an SNMP information acquisition request (SNMP trap) to the SNMP agent 122 in step 1222, and the processing is terminated.

When the DHCP packet concerned is not received within the predetermined period in step 1207 or 1214, the processing is terminated in step 1220 and subsequent DHCP packets are not received. When it is determined in step 1221 that the SNMP agent does not obtain SNMP information, the processing is also terminated in step 1220.

When it is found in step 1208 or 1215 that the information concerned is not stored in the DHCP packet, the packet is discarded and another packet is awaited.

When the SNMP agent 122 receives the SNMP-information setting completion notice (SNMP trap) from the DHCP client 121 in step 1250, the SNMP agent 122 calls the client information notice section 122a in step 1251. The SNMP agent 122 checks the received message in step 1252. When the message is an SNMP information acquisition request, the SNMP agent 122 sends an SNMP information assignment request to the network-information management server 110 in step 1253. When the SNMP agent 122 receives an SNMP information assignment acknowledge within a predetermined time in step 1254, the SNMP agent 122 stores the SNMP information in the SNMP management table 124 in step 1255. When the SNMP agent 122 has not received an SNMP information assignment acknowledge within a predetermined time in step 1254, the processing is terminated in step 1257. The processes performed after the SNMP information acquisition request is received in step 1252 correspond to processing in which the SNMP agent obtains SNMP information, described in the sixth embodiment. When the message is an SNMP-information setting completion notice in step 1252, or after the process of step 1255, the client information notice section 122a stores the community name 402 stored in the SNMP management table 124 into Community Name 701 of an SNMP trap 700, stores the IP address of the client 120 into Agent Address 702, stores the host name of the client 120 into Variable Bindings 703, and sends the SNMP trap to the monitoring server 100 in step 1256.

Figure 15:
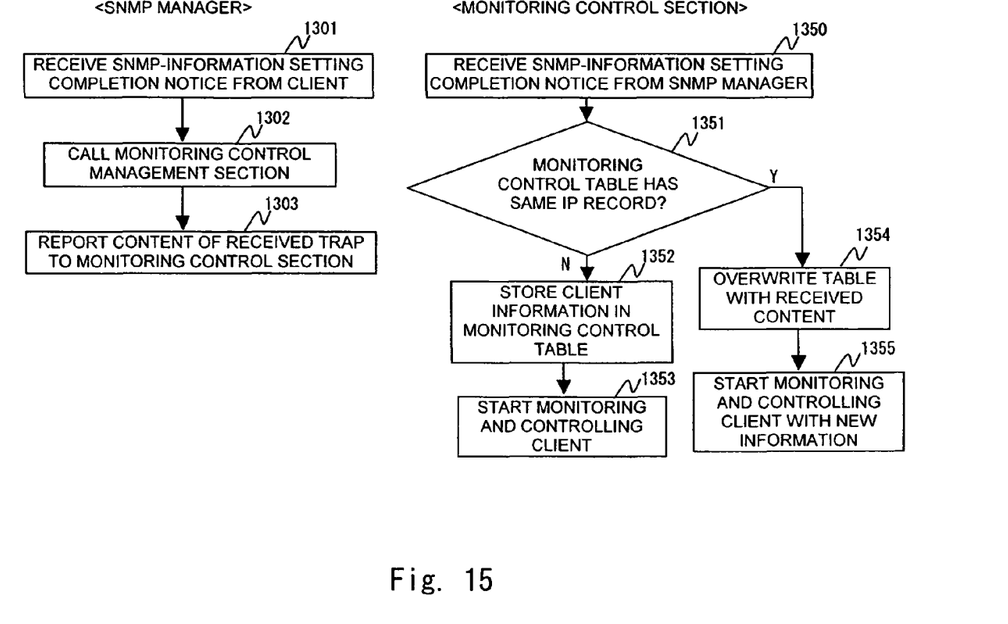
FIG. 15 shows flowcharts of processing of an SNMP manager and a monitoring control section on the monitoring server.

FIG. 15 show flowcharts of processing performed by an SNMP manager and a monitoring control section on a monitoring server. The operations of the SNMP manager 101 and the monitoring control section 103 will be described below by referring to FIG. 15.

When the SNMP manager 101 receives the SNMP-information setting completion notice (SNMP trap) from the client 120 in step 1301, the SNMP manager 101 calls the monitoring control management section 101a, and sends the contents of the received trap to a port of the monitoring control section 103 with UDP/IP in step 1303.

When the monitoring control section 103 receives the SNMP-information setting completion notice from the SNMP manager 101 in step 1350, the monitoring control section 103 checks in step 1351 whether the monitoring control table 102 has the same record as the IP address of the client 120. When the monitoring control table 102 does not have the same record, the monitoring control section 103 stores the host name, the IP address, and the community name of the client 120 into the monitoring control table 102 in step 1352, and starts monitoring and controlling the client 120 in step 1353.

When the monitoring control table 102 has the same record as the IP address in the step 1351, the monitoring control section 103 overwrites the monitoring control table 102 with the newly received contents in step 1354, and starts monitoring and controlling the client 120 with the new information in step 1355.

3. Other Embodiments

Second Embodiment

In the first embodiment, above described, the network-information management server 110, the client 120, and the client 130 form one set in FIG. 1. A plurality of sets of network-information management servers and clients may be used.

Third Embodiment

In the first embodiment, above described, the monitoring server 100, the network-information management server 110, the client 120, and the client 130 form one set in FIG. 1. A plurality of sets of monitoring servers, network-information management servers and clients may be used.

Fourth Embodiment

The first embodiment, described above, may be modified such that step 1005 and step 1006 are be omitted in FIG. 10, and, after the client 120 receives DHCPOFFER, IP information and SNMP information is set in step 1007.

Fifth Embodiment

The first embodiment, described above, may be modified such that step 1008 is omitted in FIG. 10, and the maintenance person directly inputs information of the client 120 into the monitoring control table 102 of the monitoring server 100.

Sixth Embodiment

The first embodiment, described above, may be modified such that, in FIG. 10, SNMP information setting is obtained after the client 120 obtains IP information setting with DHCP.

Figure 16:
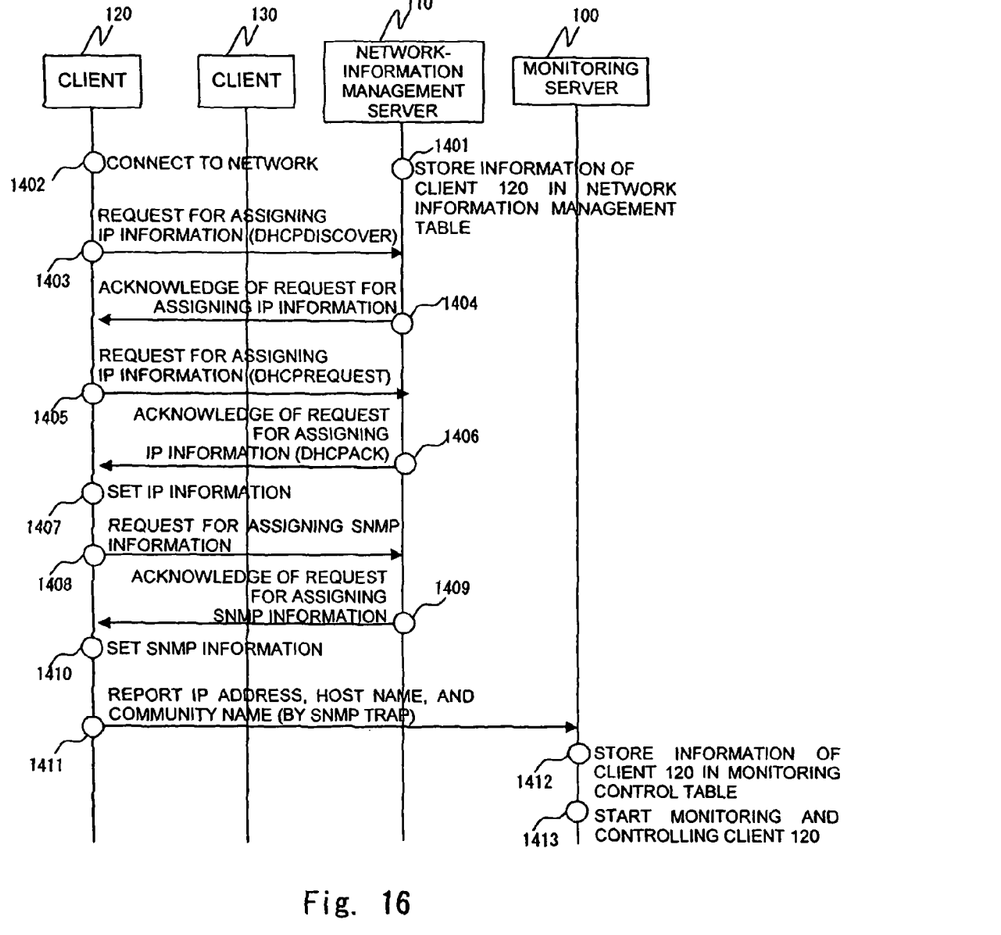
FIG. 16 shows a sequence used when the client apparatus automatically sets SNMP information after setting IP information.

FIG. 16 shows a sequence used in that case. In step 1403, the DHCP client 121 requests only IP information that includes an IP address and a net mask without requesting SNMP-information assignment when broadcasting DHCP-DISCOVER. In step 1404, the DHCP server 111 assigns the IP address and the net mask only.

The same processes are performed in steps 1405 and 1406 as described above, and then the DHCP client 121 sets the IP information in step 1407.

Next in step 1408, the SNMP agent 122 of the client 120 sends an SNMP-information assignment request to the network-information management server 110. In step 1409, the SNMP agent 112 of the network-information management server 110 assigns SNMP information.

Then, the SNMP agent 122 of the client 120 sets the SNMP information in step 1410. In step 1411 and subsequent steps, the same processes as those in the corresponding steps in FIG. 10 are performed.

According to the sixth embodiment, the step where the SNMP information is set differs from the step where the IP information is set. Since the SNMP agent obtains the SNMP information, this method is useful for a case in which a DHCP process needs to be avoided, or for other cases.

Seventh Embodiment

In cases where other protocols such as CMIP, HTTP, and TL1 are used, network management information can be automatically set in the same procedure as for SNMP although the network management information required for the other protocols differs depending on the application implementation method.

4. Application to Ratio Communication Network

Eighth Embodiment

An embodiment in which the present invention is applied to a radio communication network will be described below.

Figure 17:
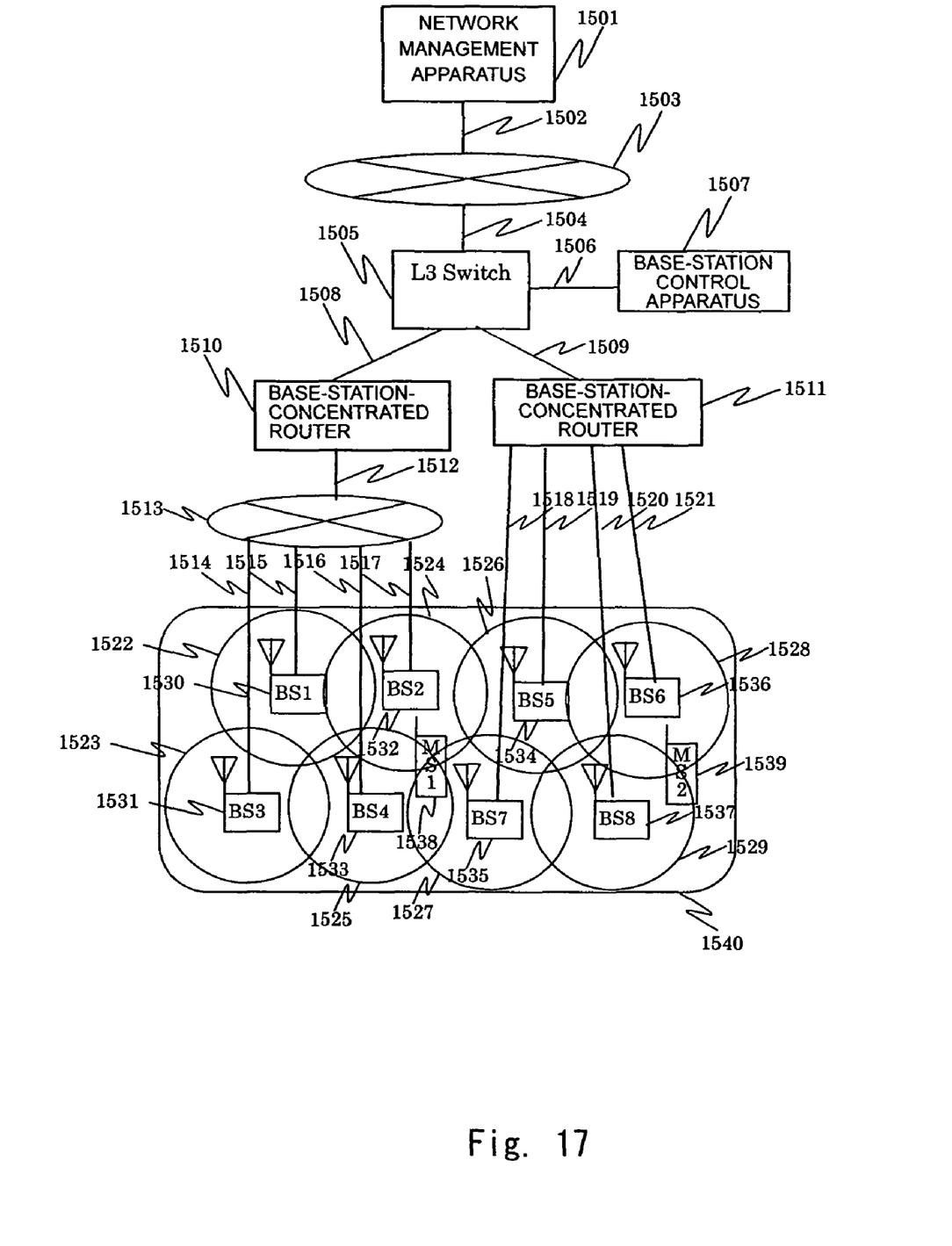
FIG. 17 is a block diagram showing the structure of a radio communication network and its example operation.

FIG. 17 is a block diagram of the structure of the radio communication network and its example operation.

A plurality of movable terminals MS1 1538 and MS2 1539 is connected to a plurality of radio communication apparatuses (hereinafter called radio stations) BS1 1530 to BS8 1537 with radio communication paths, not shown. More specifically, the base stations BS1 1530 to BS8 1537 have radio-wave reach regions called cellulars 1522 to 1529, and perform radio communication, for example, with the terminal MS1 or MS2 by CDMA. The cellulars of the base stations BS1 1530 to BS8 1537 overlap. For example, communication paths 1520 and 1521 can be set through a plurality of base stations BS6 and BS8 from the terminal MS2 1539. In the present embodiment, an area where the plurality of base stations BS1 1530 to BS8 1537 can communicate with a terminal MS is called a mobile communication network 1540.

The base stations BS1 1530 to BS8 1537 in the mobile communication network 1540 are connected to base-station-concentrated routers 1510 and 1511 through a communication network 1513 and leased lines 1518 to 1521. The communication network 1513 is a wide Ethernet or others. The base-station-concentrated routers 1510 and 1511 concentrate the plurality of base stations BS1 1530 to BS8 1537, and perform routing processing for a network management apparatus 1501, a base-station control apparatus 1507, and an L3 switch 1505. The L3 switch 1505 has a layer-3 switching function, and performs routing processing for the network management apparatus 1501, the base-station control apparatus 1507, and the base-station-concentrated routers 1510 and 1511. The base-station control apparatus 1507 performs packet-data control and data-session information management according to the radio states of the base stations BS1 1530 to BS8 1537, and terminal authentication of the terminals MS1 1538 and MS2 1539. The network management apparatus 1501 is connected to the L3 switch 1505 through a communication network 1503, and monitors and controls, by using SNMP, the base stations BS1 1530 to BS8 1537, the L3 switch 1505, the base-station control apparatus 1507, and the base-station-concentrated routers 1510 and 1511.

The base stations BS1 1530 to BS8 1537 have the same functions as the clients 120 and 130 shown in FIG. 1. The base-station-concentrated routers 1510 and 1511 have the same functions as the network-information management server 110 shown in FIG. 1. The network management apparatus 1501 has the same functions as the monitoring server 100 shown in FIG. 1.

As shown in the sequence diagram of FIG. 10, when the base stations BS1 1530 to BS8 1537 are connected to the base-station-concentrated routers 1510 and 1511 through the communication network 1513 or the leased lines 1518 to 1521 in step 1002, the base stations BS1 1530 to BS8 1537 send a request for assigning IP information and network management information (SNMP information) to the base-station-concentrated routers 1510 and 1511 in steps 1003 and 1005. The base-station-concentrated routers 1510 and 1511 assign the IP information and the network management information (SNMP information) to the base stations BS1 1530 to BS8 1537 in step 1004 and 1006. The base stations BS1 1530 to BS8 1537 sets the IP information and the network management information (SNMP information) in step 1007, and then, report to the network management apparatus 1501 that the network management information has been set in step 1008. The network management apparatus 1501 stores information of the base stations BS1 1530 to BS8 1537 in step 1009, and starts monitoring them in step 1010.

Ninth Embodiment

As described in the sixth embodiment, the base stations BS1 1530 to BS8 1537 may set SNMP information after setting IP information with DHCP.

In that case, as shown in FIG. 16, the base stations BS1 1530 to BS8 1537 are connected to the base-station-concentrated routers 1510 and 1511 through the communication network 1513 or the leased lines 1518 to 1521 in step 1402. In step 1403, the base stations BS1 1530 to BS8 1537 request only IP information that includes an IP address and a net mask without requesting a network-management-information (SNMP-information) assignment when broadcasting DHCP-DISCOVER. In step 1404, the base-station-concentrated routers 1510 and 1511 assign the IP address and the net mask only.

The same processes are performed in steps 1405 and 1406 as described above, and then the base stations BS1 1530 to BS8 1537 set the IP information in step 1407.

Next in step 1408, the SNMP agents 122 of the base stations BS1 1530 to BS8 1537 send an SNMP-information assignment request to the base-station-concentrated routers 1510 and 1511. In step 1409, the SNMP agents 112 of the base-station-concentrated routers 1510 and 1511 assign SNMP information.

Then, the SNMP agents 122 of the base stations BS1 1530 to BS8 1537 set the SNMP information in step 1410. In step 1411 and subsequent steps, the same processes as those in the corresponding steps in FIG. 10 are performed.

This embodiment is effective for a system, such as a large-scale network or a radio base station, where very many client apparatuses are disposed in a scatter manner at may places, and a plurality of monitoring serveres manages the client apparatuses in a centralized way. The embodiment is also effective for a system where security protection is required when client apparatuses are connected to a network such as a wide Ethernet.

What is claimed is:

1. A network system comprising:
a monitoring server,
a DHCP server,
a client including a DHCP client, a SNMP agent, a IP management table for storing an IP address and a SNMP management table for storing SNMP information including a community name; and
a network to which the monitoring server and the DHCP server are connected;
in which the DHCP server including a network-information management table that has stored IP information and SNMP information assigned to a client in association with the address of the client, implementing a DHCP function which refers to the network-information management table to assign IP information automatically when the client is newly connected to a network, and implementing an SNMP information management function which refers to the network-information management table to assign SNMP information automatically when the client is newly connected to a network;
wherein the DHCP client broadcasts a first request signal that has stored an assignment request of IP information and SNMP information when the client is newly connected to the network;
when receiving the first request signal, the DHCP server, by the DHCP function and the SNMP information management function, automatically searches the network-information management table, to obtain the IP information and the SNMP information corresponding to the address of the client, stores the IP information and the SNMP information in a first acknowledge signal, and unicasts the signal to the client;
when receiving the first acknowledge signal, the DHCP client broadcasts a second request signal that has stored an assignment request of IP information and SNMP information, to report to the DHCP server that the received information is to be used;
when receiving the second request signal, the DHCP server, by the DHCP function and the SNMP information management function, automatically searches the network-information management table to obtain the IP information and the SNMP information corresponding to the address of the client, stores the IP information and the SNMP information in a second acknowledge signal, and unicasts the signal to the client;
when receiving the second acknowledge signal, the DHCP client stores the IP information stored in the second acknowledge signal, into the IP management table, and stores the SNMP information stored in the second acknowledge signal, into the SNMP management table;
the SNMP agent of the client stores an IP address read from the IP management table, a community name read from the SNMP management table, and a host name of the client into a notice signal, and sends the notice signal to the monitoring server; and
when receiving the notice signal, the monitoring server stores information of the client in a monitoring control table, and starts monitoring and controlling the client.

2. A network system according to claim 1, wherein the IP information includes an IP address and a net mask, and
the SNMP information includes a source IP, a community name, an access right, and a notice setting.

3. A network system according to claim 1, wherein the client comprises:
means for requesting an assignment of IP information and SNMP information when the client is connected to the network;
means for recording assigned information;
means for reporting that assignment has been completed; and
means for performing network management by using the assigned information.

4. A network system according to claim 1, wherein the DHCP server having a network setting server function comprises:
means for assigning IP information,
means for assigning SNMP information, and
means for recording the IP information and the SNMP information.

5. A network system according to claim 1, wherein the monitoring server comprises:
means for determining that IP information and SNMP information have been assigned;
means for recording information of the client; and
means for monitoring the client by using detected information.

6. A network system according to claim 1, wherein a plurality of DHCP servers is provided, and
the client is capable of obtaining SNMP information from one of the plurality of DHCP servers.

7. A network system according to claim 1, wherein a plurality of sets of clients and DHCP servers are provided, and
the monitoring server is capable of monitoring and controlling the plurality of sets of clients and DHCP servers according to a notice signal.

8. A network system comprising:
a network management apparatus,
a router including a DHCP server,
a base station including a DHCP client, a SNMP agent, a IP management table for storing an IP address and a SNMP management table for storing SNMP information including a community name, and
a network to which the network management apparatus, the router, and the base station are connected;
in which the DHCP server of the router including a network-information management table that has stored IP information and SNMP information assigned to the base station in association with the address of the base station, implementing a DHCP function which refers to the network-information management table to assign IP information automatically when the base station is newly connected to a network, and implementing an SNMP information management function which refers to the network-information management table to assign SNMP information automatically when the base station is newly connected to a network;
wherein the DHCP client of the base station broadcasts a first request signal that has stored an assignment request of IP information and SNMP information when the base station is newly connected to the network;
when receiving the first request signal, the DHCP server of the router, by the DHCP function and the SNMP information management function, automatically searches the network-information management table, to obtain the IP information and the SNMP information corresponding to the address of the base station, stores the IP information and the SNMP information in a first acknowledge signal, and unicasts the signal to the base station;
when receiving the first acknowledge signal, the DHCP client of the base station broadcasts a second request signal that has stored an assignment request of IP information and SNMP information, to report to the router that the received information is to be used;
when receiving the second request signal, the DHCP server of the router, by the DHCP function and the SNMP information management function, automatically searches the network-information management table to obtain the IP information and the SNMP information corresponding to the address of the base station, stores the IP information and network management information in a second acknowledge signal, and unicasts the signal to the base station;
when receiving the second acknowledge signal, the DHCP client of the base station stores the IP information stored in the second acknowledge signal, into the IP management table, and stores the SNMP information stored in the second acknowledge signal, into the DNMP management table;
the SNMP agent of the base station stores an IP address read from the IP management table, a community name read from the SNMP management table, and a host name of the base station into a notice signal, and sends the notice signal to the network management apparatus; and
when receiving the notice signal, the network management apparatus stores information of the base station in a monitoring control table, and starts monitoring and controlling the base station.

9. A network system according to claim 8, wherein the IP information includes an IP address and a net mask, and
the SNMP information includes a source IP, a community name, an access right, and a notice setting.

10. A network system according to claim 8, wherein the base station comprises:
means for requesting an assignment of IP information and SNMP information when the base station is connected to the network;
means for recording assigned information;
means for reporting that assignment has been completed; and
means for performing network management by using the assigned information.

11. A network system according to claim 8, wherein the router comprises:
means for assigning IP information and SNMP information for a unit which is connected to the network, and
means for recording the IP information and SNMP information.

12. A network system according to claim 8, wherein the network management apparatus comprises:
means for determining that IP information and SNMP information have been assigned;
means for recording information of the base station; and
means for monitoring the base station by using detected information.

13. A network system according to claim 8, wherein a plurality of routers is provided, and
the base station is capable of obtaining SNMP information from one of the plurality of routers.

14. A network system according to claim 8, wherein a plurality of sets of base stations and routers is provided, and
the network management apparatus is capable of monitoring and controlling the plurality of sets of base stations and routers according to a notice signal.

* * * * *